(12) United States Patent
Ebersold et al.

(10) Patent No.: US 11,666,057 B2
(45) Date of Patent: Jun. 6, 2023

(54) INTERLOCKING BAKED FOOD BRICK MAKER

(71) Applicant: SCS Direct Inc., Trumbull, CT (US)

(72) Inventors: Benjamin Ebersold, Trumbull, CT (US); Rilin Cao, Ningbo (CN)

(73) Assignee: SCS Direct Inc., Trumbull, CT (US)

( * ) Notice: Subject to any disclaimer, the term of this patent is extended or adjusted under 35 U.S.C. 154(b) by 192 days.

(21) Appl. No.: 16/947,302

(22) Filed: Jul. 28, 2020

(65) Prior Publication Data

US 2020/0352179 A1 Nov. 12, 2020

Related U.S. Application Data

(62) Division of application No. 16/699,901, filed on Dec. 2, 2019, now Pat. No. 11,617,372.

(60) Provisional application No. 62/780,357, filed on Dec. 17, 2018.

(51) Int. Cl.
*A21D 13/48* (2017.01)
*A21D 13/80* (2017.01)
*A21D 13/45* (2017.01)

(52) U.S. Cl.
CPC ............. *A21D 13/48* (2017.01); *A21D 13/45* (2017.01); *A21D 13/80* (2017.01)

(58) Field of Classification Search
CPC ......... A21D 13/48; A21D 13/45; A21D 13/80
See application file for complete search history.

(56) References Cited

U.S. PATENT DOCUMENTS

| | | | |
|---|---|---|---|
| 1,947,124 | A | 2/1934 | Clauss |
| 2,414,131 | A | 1/1947 | Zenses |
| 3,005,282 | A | 10/1961 | Christensen |
| 3,597,875 | A | 8/1971 | Christiansen |
| D373,452 | S | 9/1996 | Gobble et al. |
| D392,153 | S | 3/1998 | Wright |
| D725,342 | S | 3/2015 | Desposito |
| 2005/0223907 | A1 | 10/2005 | Albritton et al. |
| 2007/0277678 | A1* | 12/2007 | Mangano ............. A47J 37/0611 99/426 |

(Continued)

FOREIGN PATENT DOCUMENTS

WO 2017125723 A1 6/2017

OTHER PUBLICATIONS

Merriam-Webster, "Cavity" definition, https://www.merriam-webster.com/dictionary/cavity, last viewed Nov. 9, 2021.

(Continued)

*Primary Examiner* — Donald R Spamer
*Assistant Examiner* — Jeffrey D Benson
(74) *Attorney, Agent, or Firm* — Kintner IP, LLC; Mary Frances Ludwig (57) ABSTRACT

An interlocking baked food brick maker has an electric heating element and an interlocking baked food brick mold. The interlocking baked food brick mold has stud cavities on a bottom plate and recess projections on a top plate so that it makes interlocking baked food bricks that have studs on top and matching recesses on the bottom. The studs of one interlocking baked food brick fit into the recesses of another interlocking baked food brick so that multiple interlocking baked food bricks can be joined together to form a structure.

12 Claims, 11 Drawing Sheets

(56) References Cited

U.S. PATENT DOCUMENTS

2014/0259970 A1* 9/2014 Shapiro ............... E04F 13/0839
52/27
2019/0000092 A1 1/2019 Shaw
2019/0299492 A1* 10/2019 Arendt ................. A23G 3/0268

OTHER PUBLICATIONS

CucinaPro, Amazon.com: Four Square Waffle Maker—Non-stick Waffler Iron w Adjustable Browning Control—Beeps When Ready, https://www.amazon.com/Non-stick-Waffler-Adjustable-Browning-Control/dp/B002HWS7BS, last viewed Oct. 26, 2018.

FoodFindsAsia.com; Brick Burger: Lego-inspired Restaurant, Awesome Food; https://www.foodfindsasia.com/brick-burger-lego-inspired-restaurant-awesome-food/; last viewed Dec. 11, 2018.

Allrecipes.com, Good Old Fashioned Pancakes Receipe, https://www.allrecipes.com/recipe/21014/good-old-fashioned-pancakes/, last viewed Oct. 31, 2018.

Dovas, Bored Panda, How To Make Edible & Stackable Lego Gummy Candy, I https://www.boredpanda.com/edible-lego-brick-gummy-diy-king-of-random-grant-thompson/?utm_source=google&utm_medium=organic&utm_campa%E2%80%A6, last viewed Dec. 11, 2018.

Internet Images last viewed Nov. 26, 2018.

Fandom, Brickipedia, Lego Eggo Waffles, https://lego.fandom.com/wiki/LEGO_Eggo_Waffles , last viewed Oct. 26, 2018.

Alibaba.com, pu foam brick.brick stress toy, https://www.alibaba.com/product-detail/pu-foam-brick-toy-brick-stress_60681659563.html, last viewed Nov. 26, 2018.

Tyler, thinking, expose: poorly Lego'd Eggos, http://tylemeylon.com/tJlog/2008/09/expos-poorly-legod- eggos.html, last viewed Nov. 20, 2018.

Allrecipes.com, Waffles I Recipe, https://www.allrecipes.com/recipe/22180/waffles-i/, last viewed Oct. 31, 2018.

The Wayback Machine, Waffle Maker Buying Guide\ Type of Waffles, 2017, pp. 1-13.

* cited by examiner

INTERLOCKING BAKED FOOD BRICK MAKER

FIELD OF INVENTION

The inventions described herein are in the field of food appliances.

BACKGROUND

Figure 1:
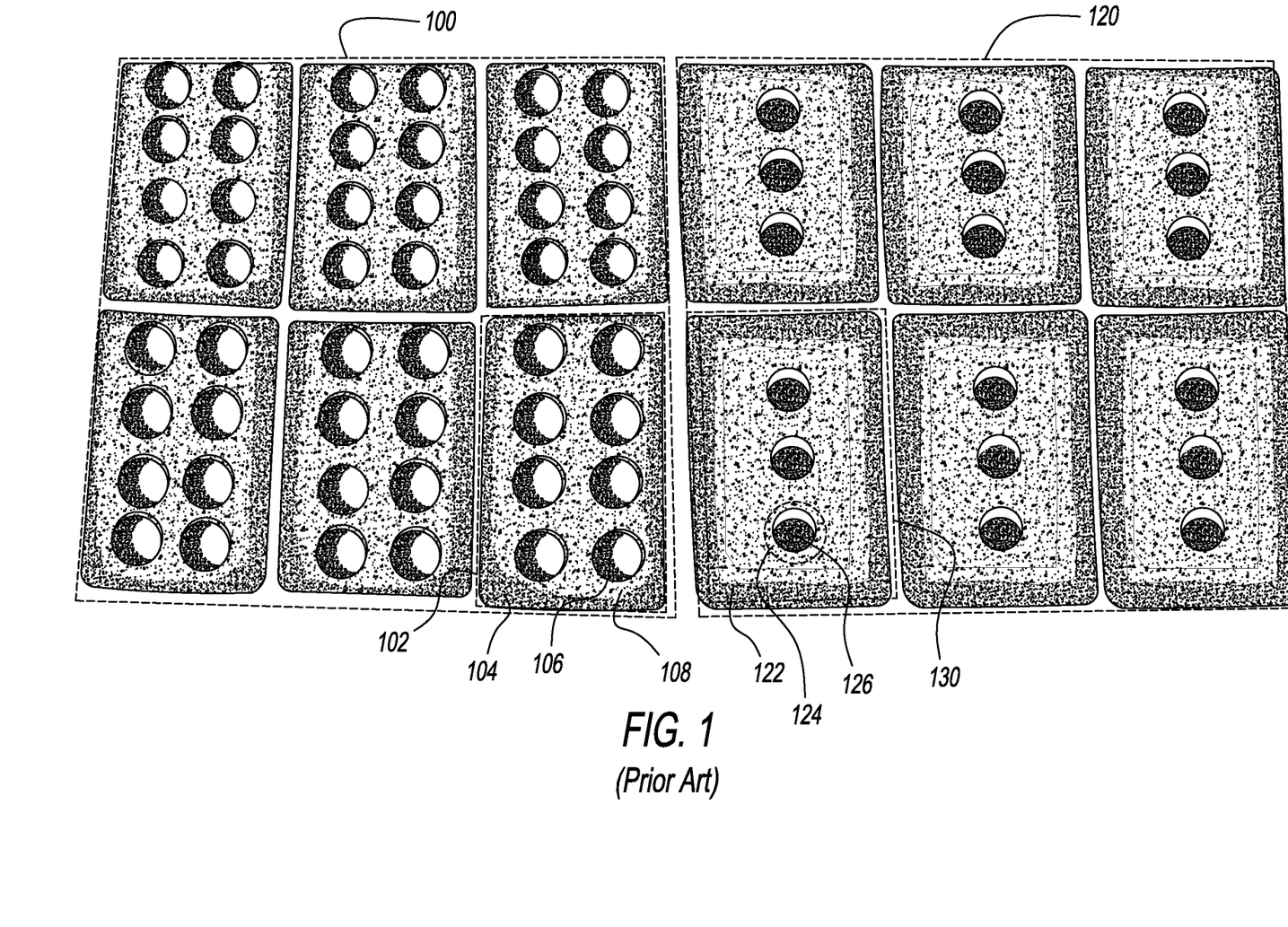
FIG. 1 is a drawing of a photograph of the top and bottom of prior art baked food bricks.

People like to play with their food. One way to play with food is to build a structure. FIG. 1 is a drawing of a photograph of a top view 100 and bottom view 120 of a prior art food brick. The food brick is a waffle. The food brick is suitable for building a structure. The food brick is divided into individual bricks (e.g. items 102, 130).

The top 104 of an individual food brick comprises one or more studs 106. Each stud is described by a location 108. The studs are arranged in two parallel rows of four studs each. The rows are along the sides of an individual food brick.

The bottom 122 of an individual food brick comprises one or more recesses 126. Each recess is described by a location 124. The recesses are arranged in a single row of three recesses. The row is down the center of the individual food brick.

The studs and recesses are not aligned with each other. By "aligned", it is meant that if the individual bricks are stacked one on top another to make a structure, the studs on top of a lower brick will be located underneath the recesses in the bottom of an upper brick so that they can interlock with each other to increase the mechanical stability of the structure. In the prior art individual food bricks, there is no alignment between the studs on the top of a lower individual food brick and the recesses in the bottom of an upper individual food brick.

There is need, therefore, for a food brick where the individual food bricks will interlock with each other when they are stacked on top of each other so that they can form a stable food brick structure.

SUMMARY OF INVENTION

The summary of the invention is a guide to understanding the invention. It does not necessarily describe the most generic embodiment.

Figure 2:
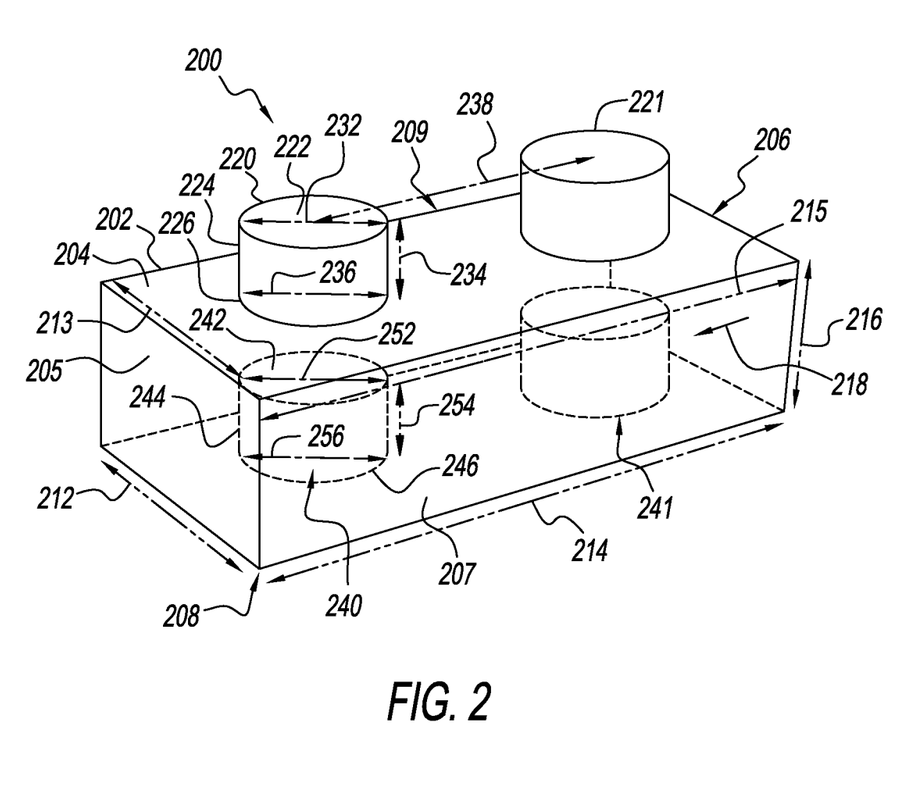
FIG. 2 is a semi-transparent drawing of an interlocking baked food brick.

FIG. 2 is a semi-transparent drawing of an orthographic projection of an interlocking baked food brick 200. The interlocking baked food brick comprises:
a) a top surface 204 comprising a first stud 220; and
b) a bottom surface 208 comprising a first recess 240 wherein:
c) said first stud is aligned with said first recess; and
d) said first stud is dimensioned to fit within said first recess.

The interlocking baked food brick may be a waffle, a cake, or any baked food product that expands when cooked, such as by the release of gas from a leavening agent. As used herein, the term "baked" means any high temperature food cooking process including frying and microwaving. If the interlocking baked food brick is a waffle, it may be dimensioned so that no location within the interlocking baked food brick has a depth 218 that is more than a "cooking distance" from a closest surface. By "cooking distance", it is meant the distance into a body that will cook before a cooking process is concluded. 8 mm is a suitable cooking distance for a conventional waffle batter cooked in a waffle iron at a conventional control temperature.

The first stud may comprise a column 224. The column may be tapered so that the top width 232 of the column is less than the bottom width 236 of the column. The taper will help the interlocking baked food brick release from a mold after it is cooked. The taper may be about 4°.

DETAILED DESCRIPTION

The detailed description describes non-limiting exemplary embodiments. Any individual features may be combined with other features as required by different applications for at least the benefits described herein. As used herein, the term "about" means plus or minus 10% of a given value unless specifically indicated otherwise.

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

As used herein, the term "shaped" means that an item has the overall appearance of a given shape even if there are minor variations from the pure form of said given shape.

As used herein, the term "generally" when referring to a shape means that an ordinary observer will perceive that an object has said shape even if there are minor variations from said shape.

As used herein, reference to a singular item implies disclosure of the plural of said item unless specifically indicated otherwise.

As used herein, relative orientation terms, such as "up", "down", "top", "bottom", "left", "right", "vertical", "horizontal", "distal" and "proximal" are defined with respect to an initial presentation of an object and will continue to refer to the same portion of said object even if the object is subsequently presented with an alternative orientation, unless otherwise noted.

Interlocking Baked Food Brick

Referring again to FIG. 2, the interlocking baked food brick 200 comprises a body 202. The body comprises a top surface 204, opposing side surfaces 205, 206, a front surface 207, a back surface 209 and a bottom surface 208. Each side surface is described by a bottom width 212 and a top width 213. The top width may be less than the bottom width so that the interlocking baked food brick can be easily removed from a mold when baked. The front and back surface may each be described by a bottom length 214 and top length 215. The top length may be less than the bottom length so that the interlocking baked food brick can be easily removed from a mold when baked. The top surface and bottom surface may be separated by a height 216. The top surface and bottom surface may be about horizontal so that multiple interlocking baked food bricks can be stacked on top of each other to form a vertical brick structure. The top surface and bottom surface, however, can be any shape that allows stacking. The interlocking baked food brick can have any horizontal cross section that allows for the building of a structure, such as hexagonal or oval.

The top surface comprises a first stud 220 and a second stud 221. Any number of studs may be provided. The first and second stud are described by a center-to-center spacing 238. The spacing may be wide enough to allow side-by-side bricks of the same design to be placed on top of a bottom brick in an orthogonal orientation to the bottom brick.

Each individual stud comprises a column 224, a bottom edge 226 and a top surface 222. The bottom edge of the stud is joined to the top surface of the body. Each stud is described by a bottom width 236, a top width 232 and a height 234. The top width may be less than the bottom width so that the interlocking baked food brick is easily removed from a mold when baked.

The bottom surface of the interlocking baked food brick comprises a first recess 240 and a second recess 241. The first and second recesses may be aligned with the first and second studs above them. Thus, when multiple bricks are stacked, the recesses of an upper brick engage the studs of a lower brick to form an interlocking structure.

Each recess 240, 241 comprises a top surface 242, cylindrical side wall 244 and bottom edge 246. The bottom edge of the recess is joined to the bottom surface 208 of the body 202. Each recess may be described by a bottom width 256, a top width 252 and a height 254. The top width may be less than the bottom width so that the interlocking baked food brick is easily removed from a mold when baked.

The dimensions of a bottom recess may be slightly larger than the corresponding dimensions of a top stud such that a stud of a bottom brick will fit within the recess of a top brick. A suitable clearance between a stud of a bottom brick and a recess of a top brick is about 0.5 mm.

Any shaped stud or recess may be used provided that they fit into each other. The shapes do not have to be the same.

Waffle-Type Interlocking Baked Food Brick Molds

Figure 3:
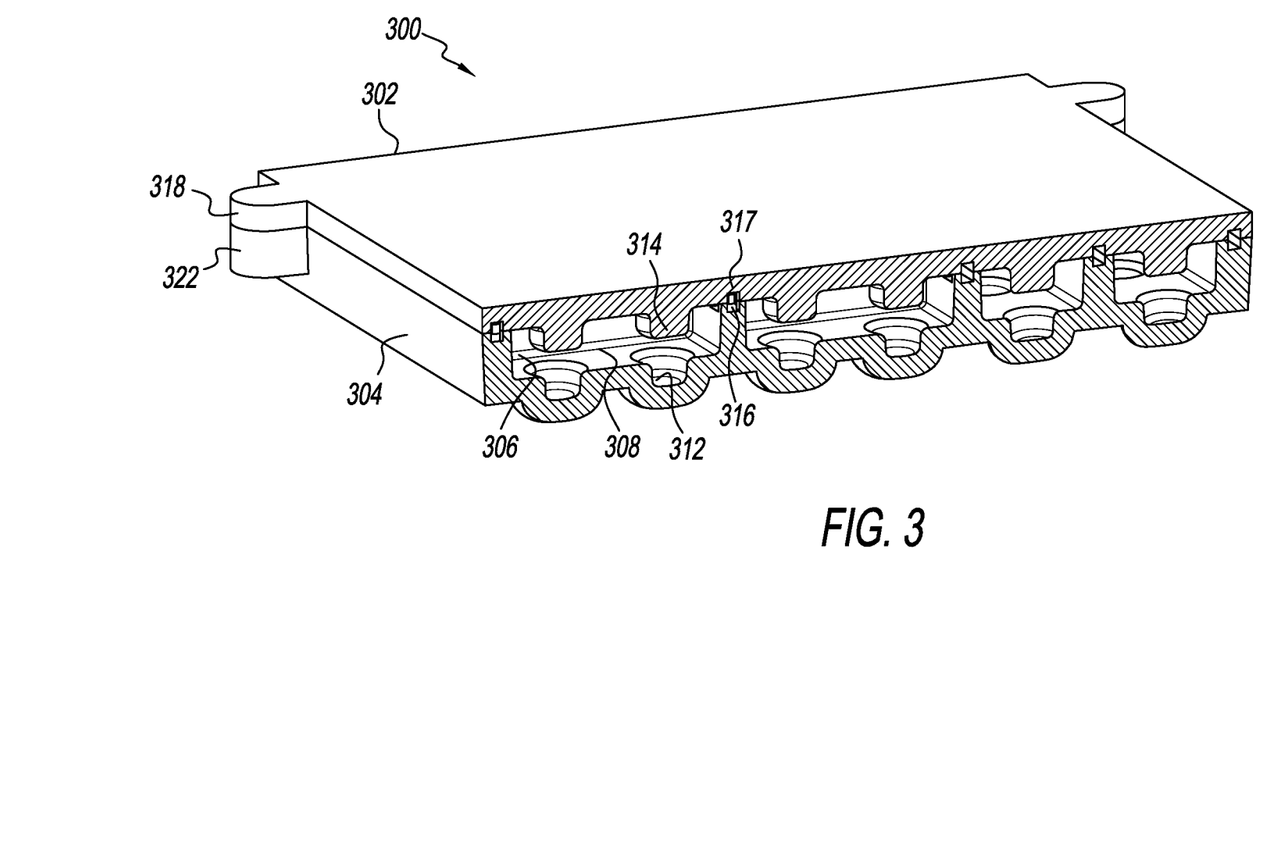
FIG. 3 is a lateral cross section of an orthographic projection of an interlocking baked food brick mold suitable for making a waffle-type interlocking baked food brick.

FIG. 3 is a lateral cross section of an orthographic projection of an interlocking baked food brick mold 300 suitable for making a waffle-type interlocking baked food brick. The mold comprises:

a) a top plate 302 comprising a first recess projection 314; and
b) a bottom plate 304 comprising a body cavity 308 comprising a first stud cavity 312
wherein:
c) said first stud cavity is aligned with said first recess projection; and
d) said first stud cavity is dimensioned to form a first stud in a first interlocking baked food brick that will fit within a first recess of a second interlocking baked food brick formed by said first recess projection.

The plates may be connected to a source of heat, such as electric resistance heaters. The temperature of the plates may be controlled, such as by thermostatic control. The plates may be made of any material suitable for baking, such as iron, steel, aluminum, copper and alloys thereof. The cooking surfaces of the plates may be coated with a food safe, temperature resistant, non-stick material, such as Teflon®.

The top plate or bottom plate may comprise a registration pin 318. The bottom plate or top plate may comprise a corresponding registration cavity 322. The registration pin and registration cavity may be aligned such that the recess projection 314 and stud cavity 312 are aligned when the plates are closed together and the registration pin is inserted into the registration cavity. The plates then form a chamber 306 within which batter will be baked to form an interlocking baked food brick.

The top plate may further comprise a top channel 317. The bottom plate may comprise a corresponding bottom channel 316. The channels allow for the escape of gasses from the body cavity when batter is poured into the mold and expands during cooking to fill the mold.

Figure 4:
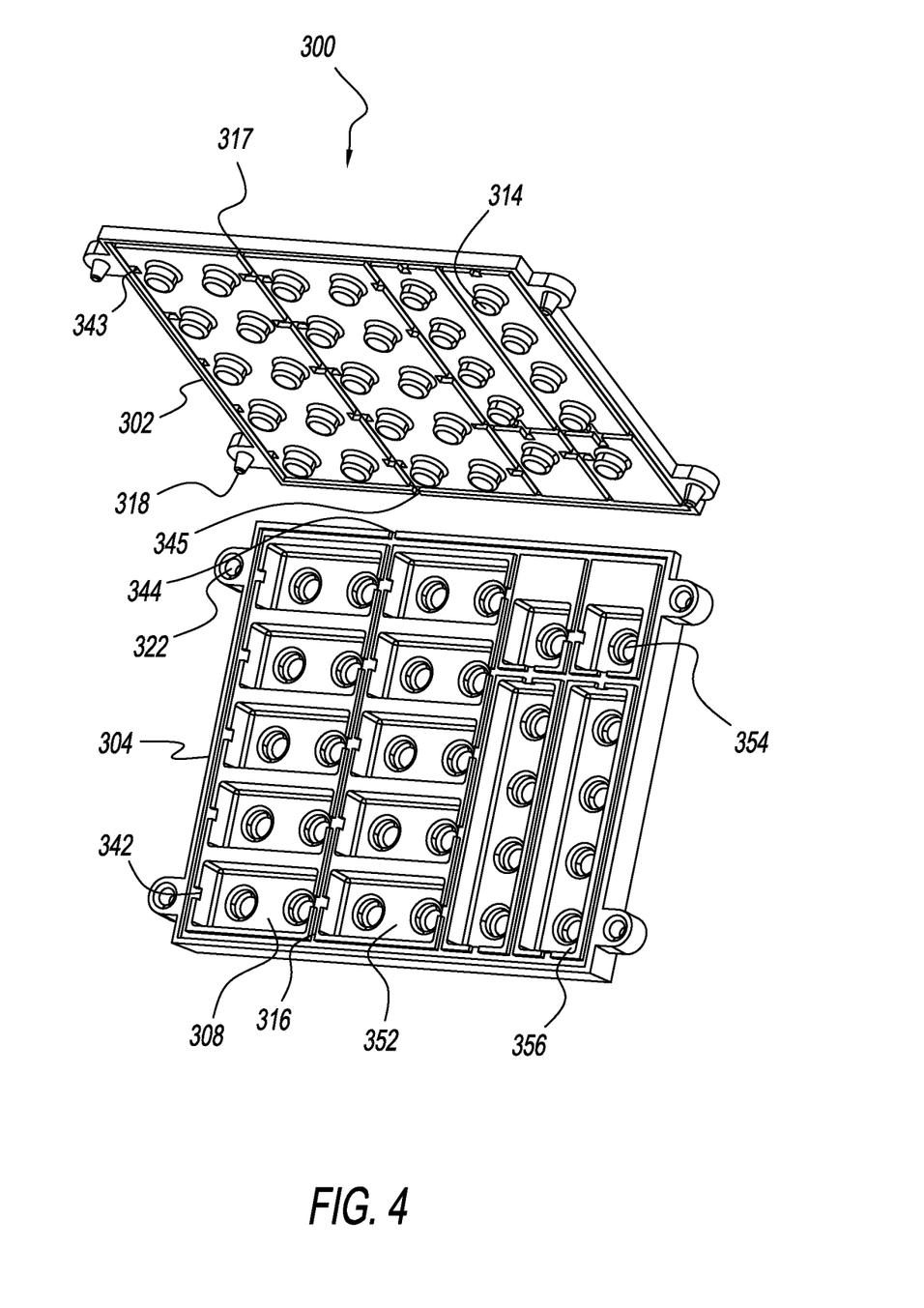
FIG. 4 is an orthographic projection of the interlocking baked food brick mold of FIG. 3 with the mold plates in a partially open configuration.

FIG. 4 is an orthographic projection of the interlocking baked food brick mold 300 of FIG. 3 with the mold plates 302, 304 in a partially open configuration. The registration pin 318, registration cavity 322, body cavity 308, bottom channel 316, recess projection 314 and top channel 317 are visible.

Each body cavity is provided with a bottom cavity vent 342 connecting said body cavity to a bottom channel. Each bottom channel is connected by a bottom channel vent 344 to the ambient air. Thus, when batter is poured into the body cavities of the bottom plate and the top plate is closed onto the bottom plate to form one or more chambers, gas inside of the chambers can escape to the ambient as the leavening agents in the batter are activated and the batter expands. One or more top cavity vents 343 and top channel vents 345 may be provided in the top plate for a similar purpose.

In this embodiment, multiple cavities for one-studded bricks 354, two-studded bricks 352 and four-studded bricks 356 are provided. The cavities are arranged to give an overall square or rectangular shape to the plates. Any shape of plates, such as round, may be used. Any combination of multi-studded bricks may be provided for in the plates. Plates suitable for mass production of interlocking baked food bricks may be used. Small cavities suitable for forming cereal pieces may be provided.

Figure 9:
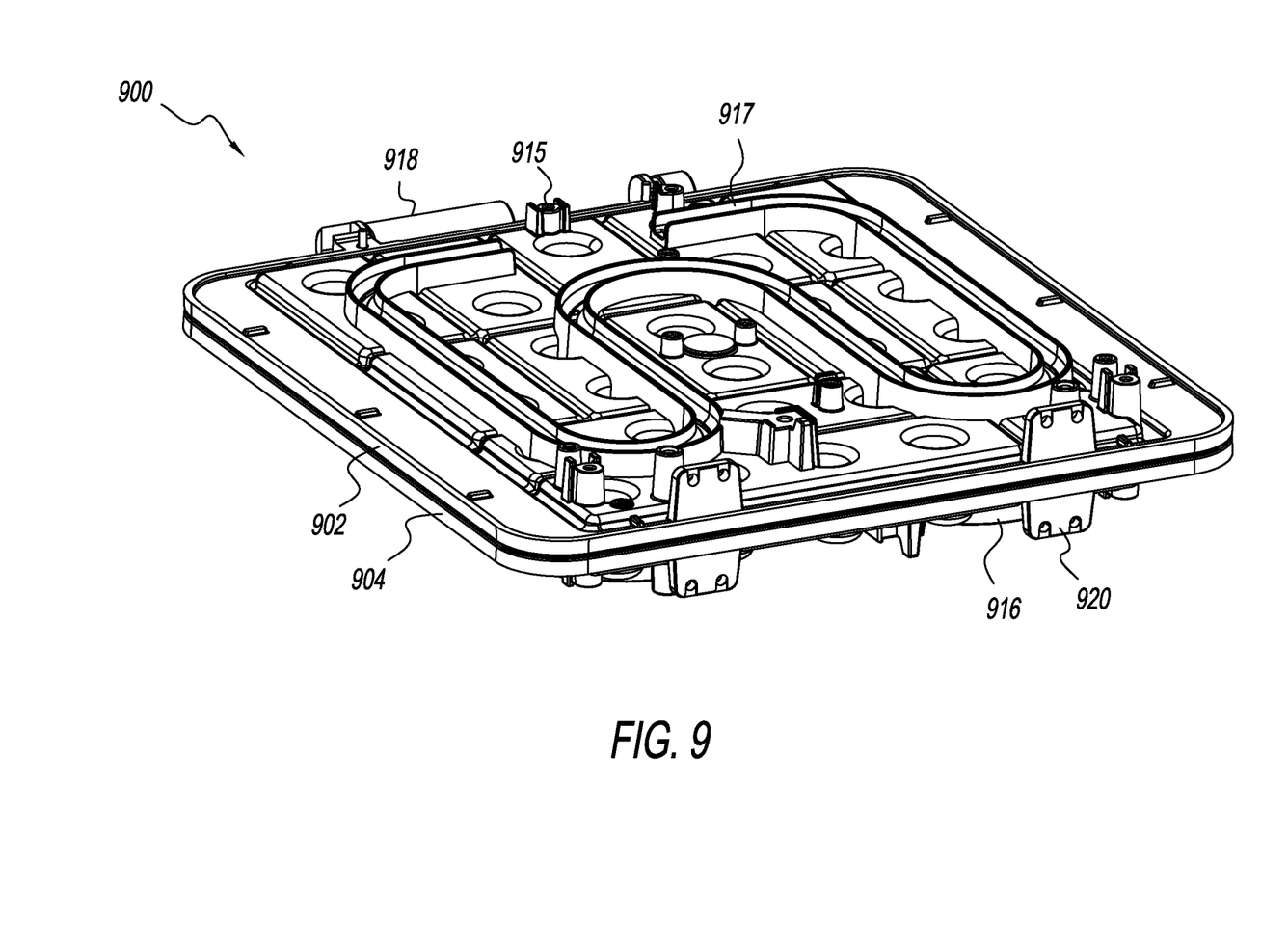
FIG. 9 is an orthographic projection of an interlocking baked food brick mold suitable for making a waffle-type interlocking baked food brick in a home waffle iron.
Figure 10:
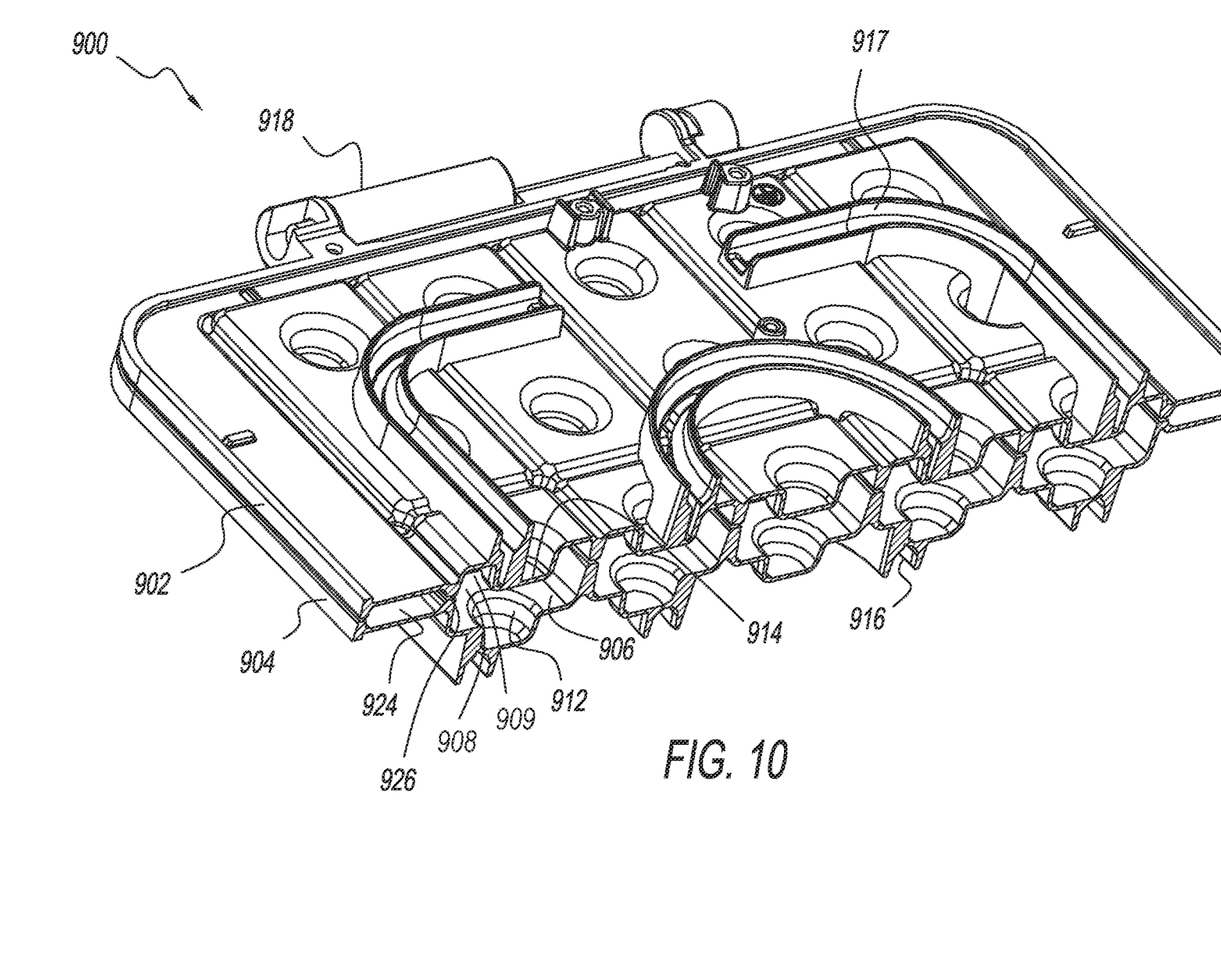
FIG. 10 is a lateral cross section of an orthographic projection of the interlocking baked food brick mold of FIG. 9.

FIG. 9 is an orthographic projection of an interlocking baked food brick mold 900 suitable for making a waffle-type interlocking baked food bricks in a home waffle iron. FIG. 10 is a lateral cross section of an orthographic projection of the interlocking baked food brick mold 900 of FIG. 9. Referring to FIGS. 9 and 10, the mold 900 comprises:

a) a top plate 902 comprising a first recess projection 914; and
b) a bottom plate 904 comprising a body cavity 908 comprising a first stud cavity 912 wherein:
c) said first stud cavity is aligned with said first recess projection; and
d) said first stud cavity is dimensioned to form a first stud in a first interlocking baked food brick that will fit within a first recess of a second interlocking baked food brick formed by said first recess projection.

The plates may be connected to a source of heat, such as electric resistance heaters. A top heater channel 917 may be provided in thermal contact to the top plate 902. The top heater channel may be press fit into the recess projections of the top plate. Any means of joining, such as screwing, gluing, welding, forging, or casting, may be used. A top electric resistance heater (not shown) may be located within the top heater channel. A bottom heater channel 916 may be provided in thermal contact to the bottom plate 904. The bottom heater channel may be press fit onto the stud cavities of the bottom plate. Any means of joining, such as screwing, gluing, welding, forging, or casting, may be used. A bottom electric resistance heater (not shown) may be located within the bottom heater channel.

The temperature of the top and bottom plates may be controlled, such as by a thermostatic controller. The plates may be made of any material suitable for baking, such as iron, steel, aluminum, copper and alloys thereof. The cooking surfaces of the plates may be coated with a food safe, temperature resistant, non-stick material, such as Teflon®.

The top and bottom plates may be joined by a rear hinge 918. The rear hinge may align the recess projection 914 and stud cavity 912 when the plates are closed. The plates then form a chamber 906 within which batter will be baked to form a food brick.

The top plate may comprise a base cavity 909. The recess projection 914 may be located within the base cavity.

The top plate and bottom plate may be dimensioned to form a side channel 924 and a plate gap 926. The plate gap is dimensioned to allow gases to escape from the chamber 906 when batter is put in the body cavity and the top plate is closed on the bottom plate for cooking. The plate gap, therefore, is a type of cavity vent.

One or more mounting flanges 920 and mounting studs 915 may be provided in the top and bottom plates to allow for attachment of a top and bottom cover (not shown) to the respective plates.

Figure 11:
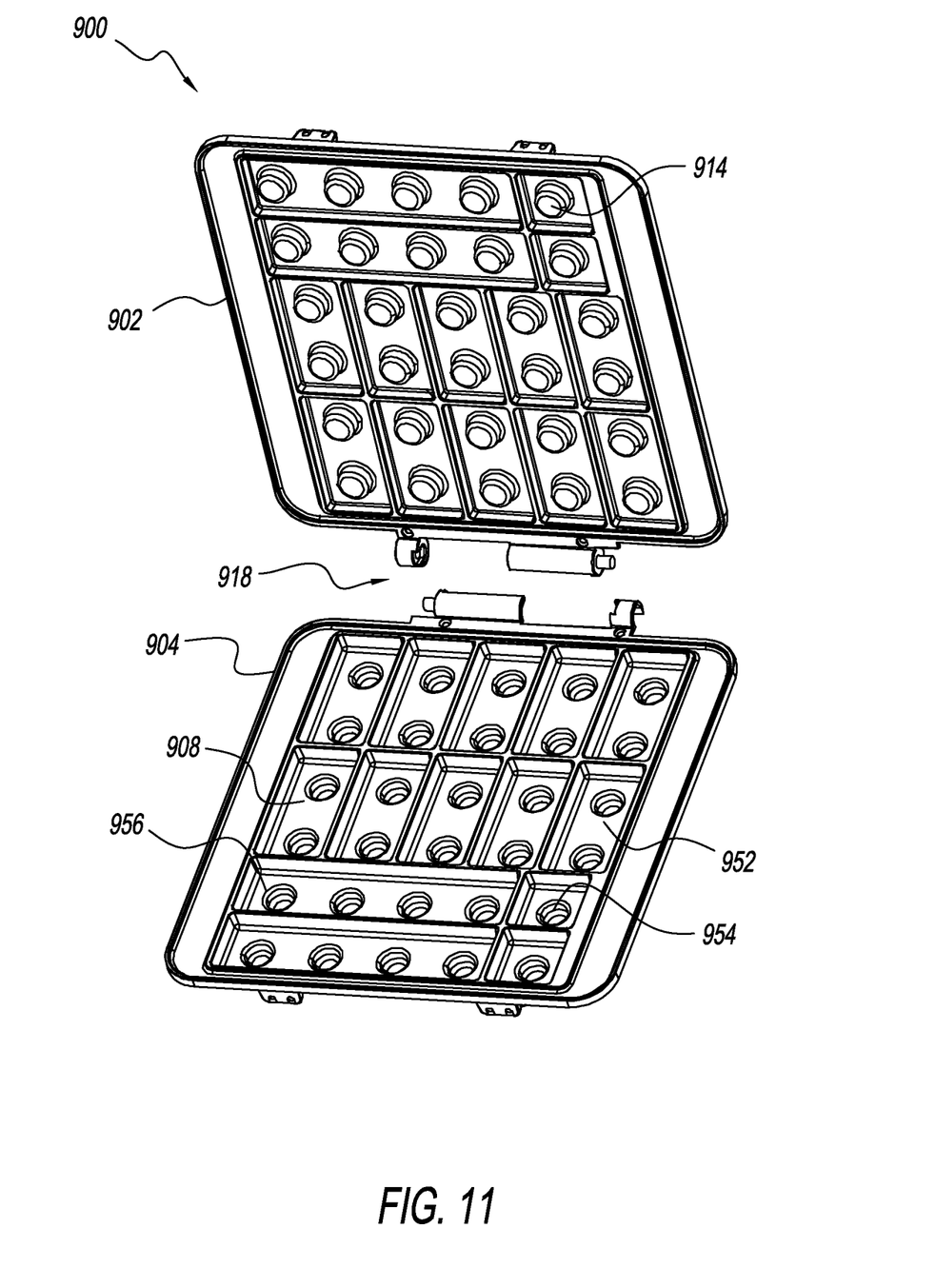
FIG. 11 is an orthographic projection of the interlocking baked food brick mold of FIG. 9 with the mold plates in a partially open configuration.

FIG. 11 is an orthographic projection of the interlocking baked food brick mold 900 of FIG. 9 with the mold plates 902, 904 in a partially open configuration. FIG. 11 is also a partially exploded view to show a detail of the rear hinge 918 construction.

In this embodiment, multiple cavities for one-studded bricks 954, two-studded bricks 952 and four-studded bricks 956 are provided. The cavities are arranged to give an overall square or rectangular shape to the plates. Any shape of plates, such as round, may be used. Any combination of multi-studded bricks may be provided for in the plates.

As described herein, it is to be understood that an interlocking baked food brick mold may be used in an orientation where the top plate is on the bottom and the bottom plate is on the top. For example, either interlocking baked food brick mold 300, 900 may be filled with the bottom plate on the bottom, closed, and then turned over for cooking. The interlocking baked food brick mold 900 may be filled with the top plate on the bottom. The base cavities 909 may be adapted to receive adequate batter to fill the mold when bottom plate is placed on the top plate and the batter expands and cooks.

Cake-Type Interlocking Baked Food Brick Mold

Figure 7:
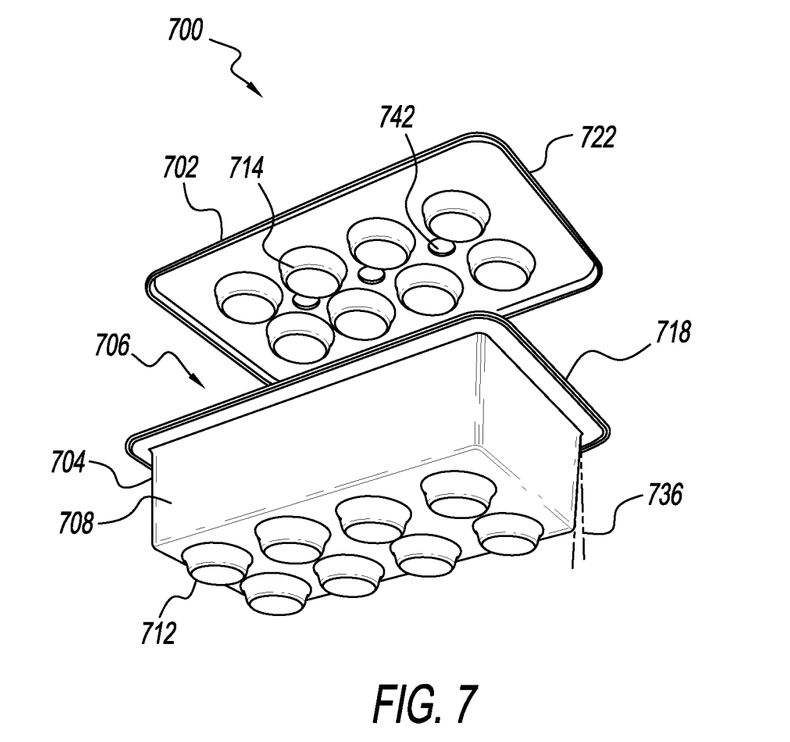
FIG. 7 is an orthographic projection of an interlocking baked food brick mold suitable for making a cake-type interlocking baked food brick.

FIG. 7 is an orthographic projection of an interlocking baked food brick mold 700 suitable for making a cake-type interlocking baked food brick. The mold may be made from similar materials as a conventional cake pan. For example, the mold may be made of steel sheet or an aluminum alloy with a non-stick surface. The mold may also comprise a food safe, temperature resistant polymer, such as silicone rubber. Silicone rubber can be used for any of the molds described herein.

Similar to the mold 300 suitable for waffle-type interlocking baked food bricks, the mold 700 suitable for cake-type interlocking baked food bricks comprises:
a) a top plate 702 comprising a first recess projection 714; and
b) a bottom plate 704 comprising a body cavity 708 comprising a first stud cavity 712
wherein:
c) said first stud cavity is aligned with said first recess projection; and
d) said first stud cavity is dimensioned to form a first stud in a first interlocking baked food brick that will fit within a first recess in a second interlocking baked food brick formed by said first recess projection.

The plates of the mold 700 may be heated by a source of heat, such as electric resistance heaters. The electric resistance heaters may be part of an electric oven. Heat is transferred from the heaters to the mold via the ambient air in the oven and/or radiation. Heat may also be provided by burners. The temperature of the oven may be controlled thermostatically.

The top plate or bottom plate may comprise a registration pin 718. In this example, the registration pin is the upper lip of the bottom plate. The bottom plate or top plate may comprise a registration cavity 722. In this example, the registration cavity is the outer downward facing edge of the top plate. The registration pin and registration cavity may be aligned such that the recess projection 714 and stud cavity 712 are aligned. A chamber 706 is formed when the plates are closed and the registration pin is inserted into the registration cavity.

One or more chamber vents 742 may be provided in the top plate to allow for air in the chamber to vent to ambient when a cake batter is placed in the body cavity and expands during baking.

All vertical surfaces of the mold 700 may be tapered 736 so that a baked cake-type interlocking baked food brick therein can be easily removed.

Waffle-Type Interlocking Baked Food Brick Structure

Figure 5:
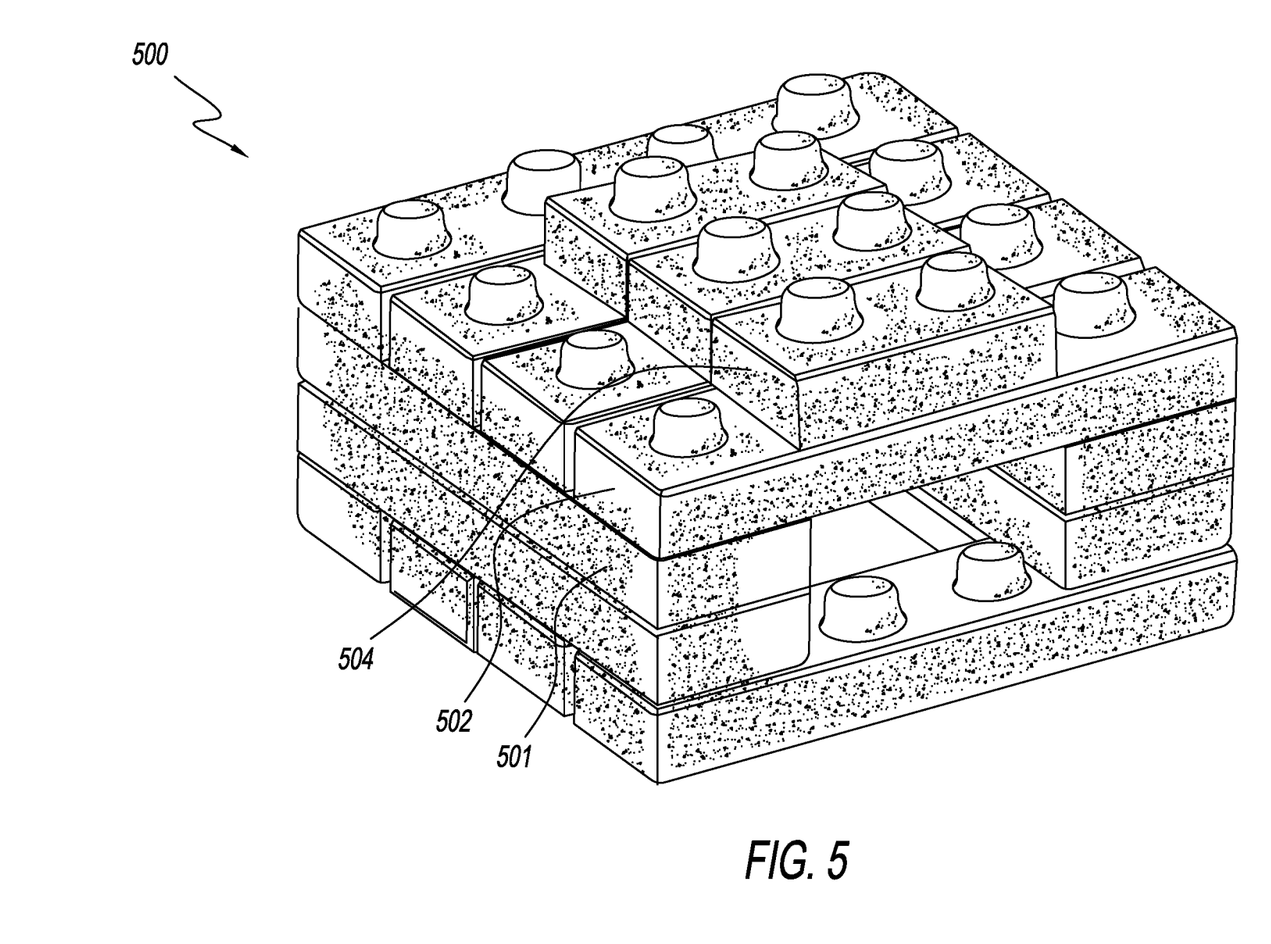
FIG. 5 is a drawing of a photograph of an interlocking baked food brick structure made from waffle-type interlocking baked food bricks.
Figure 6:
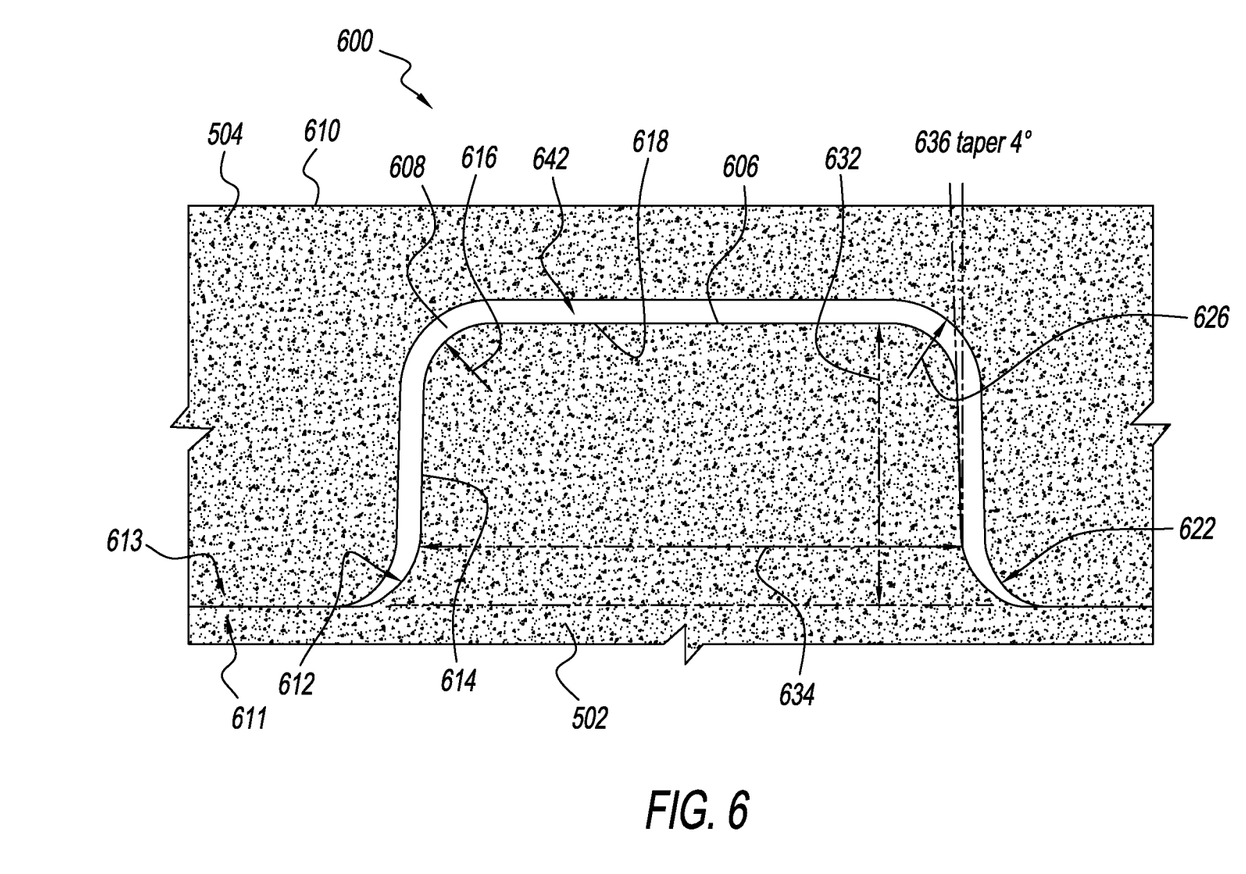
FIG. 6 is a drawing of a lateral cross section of a portion of the interlocking baked food brick structure of FIG. 5.

FIG. 5 is a drawing of a photograph of an interlocking baked food brick structure 500 made from individual waffle-type interlocking baked food bricks formed in the mold 300 of FIG. 3. FIG. 6 is a drawing of a lateral cross section 600 of a portion of the interlocking baked food brick structure of FIG. 5. Referring to FIGS. 5 and 6, the interlocking baked food brick structure comprises:
a) an upper interlocking baked food brick 504 comprising a bottom surface 613 comprising a first recess 608; and
b) a lower interlocking baked food brick 502 comprising a top surface 611 comprising a first stud 606
wherein:

c) said first stud is aligned with said first recess when said upper interlocking baked food brick is aligned with said lower interlocking baked food brick; and d) said first stud is dimensioned to fit within said first recess.

The top surface 610 of the upper interlocking baked food brick does not have to comprise a stud. It may be flat. It may be any shape, such as wavy, that is releasable from a mold.

The stud and recess may comprise rounded corners 612, 616, 626, and 622. The rounded corners may have a longitudinal radius of curvature of about 1.9 mm. This curvature is readily filled by expanding batter as it bakes without unduly trapping air.

The stud may comprise a column 614 with a bottom diameter 634 of about 15.4 mm. The height 632 of the stud top 618 above the top surface 611 of the lower interlocking baked food brick may be about 8 mm. The stud column may be tapered 636 at an angle of about 4°. Other dimensions may be suitable depending upon the physical properties of the interlocking baked food brick material.

The recess 608 of the upper interlocking baked food brick may have a clearance 642 of about 0.5 mm with respect to the stud of the lower brick.

A lower-lower interlocking baked food brick 501 is shown with an orthogonal orientation with respect to the lower brick 504.

Cake-Type Interlocking Baked Food Brick Structure

Figure 8:
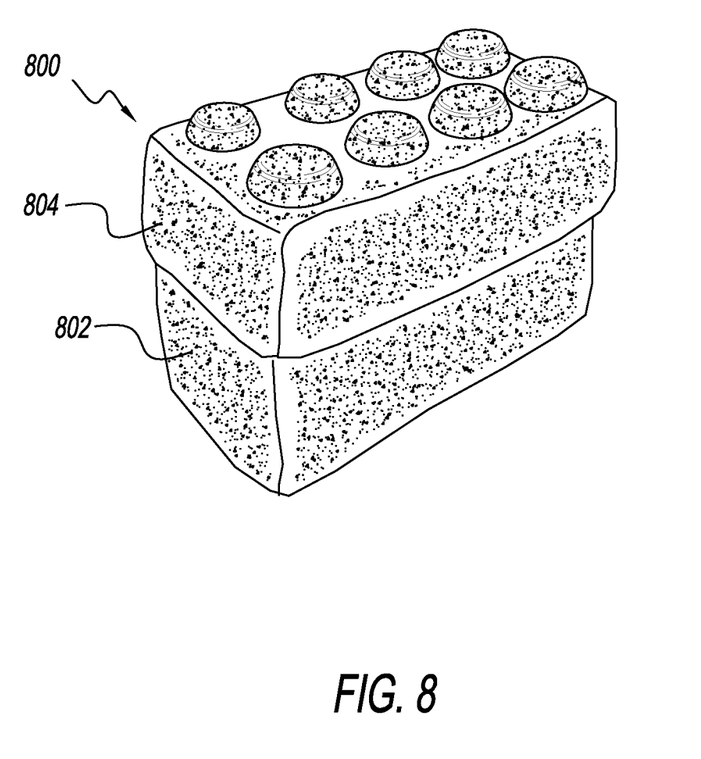
FIG. 8 is a drawing of a photograph of an interlocking baked food brick structure made from cake-type interlocking baked food bricks.

FIG. 8 is a drawing of a photograph of a cake-type interlocking baked food brick structure 800 made from cake-type interlocking baked food bricks made in the mold 700 of FIG. 7. Similar to the waffle-type interlocking baked food brick structure 500 of FIG. 5, the cake-type interlocking baked food brick structure 800 comprises:

a) an upper interlocking baked food brick 804 comprising a bottom surface comprising a first recess (not shown); and b) a lower interlocking baked food brick 802 comprising a top surface comprising a first stud (not shown) wherein:

c) said first stud is aligned with said first recess when said upper interlocking baked food brick is aligned with said lower interlocking baked food brick; and d) said first stud is dimensioned to fit within said first recess.

Batters

Any cake-type or waffle-type batter with a leavening agent may be used in the inventions described herein. This includes a conventional waffle batter, chocolate chip waffle batter, white cake batter, chocolate cake batter, gingerbread batter, pumpkin bread batter, or banana nut batter. Bread-type batters with a natural leavening agent (e.g. yeast) may also be used. Batters may be formulated for increased strength, handling, paint ability, mold resistance and shelf life properties once formed into an interlocking baked food brick.

CONCLUSION

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. Therefore, it is intended that the disclosure not be limited to the particular embodiment disclosed as the best mode contemplated for carrying out this invention.

We claim:

1. An interlocking baked food brick maker comprising:
    a) an electric heating element; and
    b) an interlocking baked food brick mold
    wherein:
    c) said electric heating element is in thermal contact with said interlocking baked food brick mold; and
    d) said interlocking baked food brick mold comprises:
        1) a top plate comprising a recessed base cavity comprising a first recess projection; and
        2) a bottom plate comprising a body cavity comprising a first stud cavity
        wherein:
        3) said first stud cavity is aligned with said first recess projection;
        4) said first stud cavity is dimensioned to form a first stud in a first interlocking baked food brick formed in said interlocking baked food brick mold that will fit within a first recess of a second interlocking baked food brick formed in said interlocking baked food brick mold; and
        5) a chamber is defined by said recessed base cavity of said top plate and said body cavity of said bottom plate when said top plate is closed on said bottom plate, wherein said chamber projects upwardly, with respect to an interface between said top plate and said bottom plate, into said top plate surrounding said first recess projection and projects downwardly, with respect to said interface, into said bottom plate.

2. The interlocking baked food brick maker of claim 1 wherein a temperature of said interlocking backed food brick mold is thermostatically controlled.

3. The interlocking baked food brick maker of claim 1 wherein said first recess projection comprises a column that is tapered at an angle of about 4°.

4. The interlocking baked food brick maker of claim 1 wherein said bottom plate is located above said top plate.

5. The interlocking baked food brick maker of claim 1 wherein said bottom plate comprises:
    a) a first body cavity comprising two stud cavities; and
    b) a second body cavity comprising four stud cavities.

6. The interlocking baked food brick maker of claim 5 wherein said bottom plate comprises a third body cavity comprising a single stud cavity.

7. The interlocking baked food brick maker of claim 5 wherein said bottom plate comprises a plurality of body cavities arranged in a generally rectangular or square shape.

8. The interlocking baked food brick maker of claim 7 wherein said bottom plate comprises a side channel along at least a portion of an outer perimeter of said generally rectangular or square shape.

9. The interlocking baked food brick maker of claim 5 wherein said top plate comprises:
    a) a first base cavity comprising two recess projections; and
    b) a second base cavity comprising four recess projections
    wherein:
    c) said first body cavity comprising two stud cavities is aligned with said first base cavity comprising two recess projections; and d) said second body cavity comprising four stud cavities is aligned with said second base cavity comprising four recess projections.

10. The interlocking baked food brick maker of claim 9 wherein said second body cavity comprising four stud cavities and said second base cavity comprising four recess projections are dimensioned such that when a first four-stud interlocking baked food brick, a second four-stud interlocking baked food brick and a third four-stud interlocking baked food brick are baked therein, said first four-stud interlocking baked food brick and said second four-stud interlocking baked food brick may be joined together when said third four-stud interlocking baked food brick is placed on top of said first four-stud interlocking baked food brick and said second four-stud interlocking baked food brick such that a first recess in a bottom of said third four-stud interlocking baked food brick will fit onto a first stud on a top of said first four-stud interlocking baked food brick and a second recess on said bottom of said third four-stud interlocking baked food brick will fit onto a first stud on a top of said second four-stud interlocking baked food brick.

11. The interlocking baked food brick maker of claim 9 wherein:
a) said two recess projections of said first body cavity are separated by a first center-to-center spacing therebetween;
b) said four recess projections of said second body cavity are arranged in a row with a second center-to-center spacing therebetween; and
c) said first center-to-center spacing is about equal to said second center-to-center spacing.

12. The interlocking baked food brick maker of claim 11 wherein said first center-to-center spacing is wide enough to allow a first two-stud interlocking baked food brick and a second two-stud interlocking baked food brick formed in said first body cavity to be placed on top of a third two-stud interlocking baked food brick formed in said first body cavity such that said third two-studded interlocking baked food brick is in an orthogonal orientation relative to both said first two-stud interlocking baked food brick and said second two-stud interlocking baked food brick.

* * * * *